United States Patent
Wabyick et al.

(10) Patent No.: US 10,216,708 B2
(45) Date of Patent: Feb. 26, 2019

(54) PAGINATED VIEWPORT NAVIGATION OVER A FIXED DOCUMENT LAYOUT

(75) Inventors: Daniel Wabyick, San Francisco, CA (US); Jeremy R. Clark, San Rafael, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1156 days.

(21) Appl. No.: 12/573,564

(22) Filed: Oct. 5, 2009

(65) Prior Publication Data

US 2014/0006982 A1 Jan. 2, 2014

(51) Int. Cl.
*G06F 17/21* (2006.01)
(52) U.S. Cl.
CPC .......... *G06F 17/212* (2013.01); *G06F 17/217* (2013.01)
(58) Field of Classification Search
CPC ...... G06F 17/211–17/212; G06F 17/24; G05F 17/217
USPC ....................................................... 715/246
See application file for complete search history.

(56) References Cited

U.S. PATENT DOCUMENTS

| | | | |
|---|---|---|---|
| 5,379,373 A | 1/1995 | Hayashi et al. | |
| 6,189,020 B1 * | 2/2001 | Shimizu | G06F 17/212 345/660 |
| 7,290,006 B2 | 10/2007 | Xie et al. | |
| 8,438,496 B1 * | 5/2013 | Hegde | G06F 3/0485 715/784 |
| 2004/0146199 A1 * | 7/2004 | Berkner et al. | 382/176 |
| 2004/0148571 A1 | 7/2004 | Lue | |
| 2006/0010375 A1 | 1/2006 | Salesin et al. | |
| 2006/0061614 A1 | 3/2006 | Kodama et al. | |
| 2006/0150092 A1 | 7/2006 | Atkins | |
| 2006/0150096 A1 | 7/2006 | Thacker et al. | |
| 2007/0094591 A1 * | 4/2007 | Etgen et al. | 715/522 |

* cited by examiner

*Primary Examiner* — Shawn S Joseph
(74) *Attorney, Agent, or Firm* — Kilpatrick Townsend & Stockton LLP

(57) ABSTRACT

The present disclosure discloses ways of navigating content. For example, techniques herein can include defining a logical flow of multiple content regions in a display page, initiating display of a first content region of the multiple content regions, the first content region of the display page displayed on a display screen according to a first zoom level, and in response to receiving navigation input in the display page to view a next content region following the first content region in the logical flow, identifying a second content region that follows the first content region in the logical flow. Additionally, embodiments herein can include analyzing parameters of the second content region to determine a second zoom level for viewing the second content region and initiating display of the second content region according to the second zoom level, the second zoom level being different than the first zoom level.

23 Claims, 16 Drawing Sheets

1000 → From Step 840 FIG. 9

830
RECEIVE NAVIGATION INPUT IN THE DISPLAY PAGE TO VIEW A NEXT CONTENT REGION FOLLOWING THE FIRST CONTENT REGION IN THE LOGICAL FLOW

1010
IDENTIFY A SECOND CONTENT REGION, THE SECOND CONTENT REGION FOLLOWING THE FIRST CONTENT REGION IN THE LOGICAL FLOW

1020
ANALYZE PARAMETERS OF THE SECOND CONTENT REGION TO DETERMINE A SECOND ZOOM LEVEL FOR VIEWING THE SECOND CONTENT REGION

1022
DETERMINING WHETHER THE CONTENT IN THE SECOND CONTENT REGION IS VIEWABLE DEPENDING ON AN AUTHORED INDICATION OF VIEWABILITY ASSOCIATED WITH THE SECOND CONTENT REGION AND A PREDETERMINED SETTING OF VIEWABILITY

1030
INITIATE DISPLAY OF THE SECOND CONTENT REGION ACCORDING TO THE SECOND ZOOM LEVEL, THE SECOND ZOOM LEVEL BEING DIFFERENT THAN THE FIRST ZOOM LEVEL

1032
PAN, IN A DIRECTION OTHER THAN A DIRECTION AS SPECIFIED BY THE NAVIGATION INPUT, TO A LOCATION OF THE SECOND CONTENT REGION IN THE DISPLAY PAGE TO DISPLAY THE SECOND CONTENT REGION

1034
PAN TO A LOCATION AS INDICATED BY THE LOGICAL FLOW OF MULTIPLE CONTENT REGIONS

1036
INITIATE DISPLAY OF TEXT IN THE SECOND CONTENT REGION TO BE SUBSTANTIALLY SIMILAR IN SIZE AS TEXT DISPLAYED IN THE FIRST CONTENT REGION

1038
AUTOMATICALLY ZOOM IN THE DISPLAY PAGE DEPENDING ON AN AUTHORED INDICATION OF TEXT SIZE ASSOCIATED WITH THE FIRST CONTENT REGION AND THE SECOND CONTENT REGION AND A PREDETERMINED SETTING OF READABILITY

To Step 1030 FIG. 10B

From Step 1038 FIG. 10A

1030
INITIATE DISPLAY OF THE SECOND CONTENT REGION ACCORDING TO THE SECOND ZOOM LEVEL, THE SECOND ZOOM LEVEL BEING DIFFERENT THAN THE FIRST ZOOM LEVEL

1052
DISPLAY A FIRST PORTION OF THE SECOND CONTENT REGION IN A WINDOW

1054
IN RESPONSE TO RECEIVING ADDITIONAL NAVIGATION INPUT TO SCROLL DOWN THE SECOND CONTENT REGION, INITIATE DISPLAY OF A SECOND PORTION OF THE SECOND CONTENT REGION IN THE WINDOW

1056
NAVIGATION INPUT TO VIEW THE NEXT CONTENT REGION AND THE ADDITIONAL NAVIGATION INPUT TO SCROLL DOWN IN THE SECOND CONTENT REGION ARE GENERATED IN RESPONSE TO SELECTION OF A SAME SELECTABLE NAVIGATION BUTTON SELECTED AT DIFFERENT TIMES

From Step 1140 FIG. 11

1310
DETERMINE WHETHER THE TEXT
(THE DISPLAY PAGE INCLUDING A PLURALITY OF COLUMNS OF TEXT)
IS READABLE BASED ON VIEWPORT PARAMETERS AND AN AUTHORED INDICATION
OF TEXT READABILITY IN THE SECOND CONTENT REGION

1312
STORE THE INDICATION OF TEXT READABILITY IN THE SECOND
CONTENT REGION IN A PAGE DOCUMENT OBJECT MODEL (DOM)

1314
ANALYZE VIEWPORT PARAMETERS INCLUDING A VIEWPORT WIDTH, A
VIEWPORT RESOLUTION AND A VIEWPORT ASPECT RATIO

1316
ZOOM THE VIEWPORT TO MATCH WIDTH OF CONTENT REGION AS A
FUNCTION OF AN AUTHORED INDICATION OF THE SIZE OF TEXT

1318
PROVIDE VIEWPORT ZOOM LEVELS TO ENABLE THE TEXT TO BE
READABLE ACCORDING TO A PREDETERMINED SETTING FOR
READABILITY

*FIG. 13*

PAGINATED VIEWPORT NAVIGATION OVER A FIXED DOCUMENT LAYOUT

BACKGROUND

Publishers are now beginning to provide content for viewing on-line using web browsers and other network enabled applications. Some of the published content includes display pages having a fixed-layout or fixed presentation format. Conventional formats having or defining a fixed-layout or fixed presentation for document contents are useful for maintaining a layout designed by an author or publisher. Fixed-layout document layouts appear approximately the same to each of multiple viewers regardless of what processor, hardware, operating system, or printer generates the document. In other words, once content is rendered in a particular configuration, the content does not adapt to changes in a viewport size.

Fixed-layout documents have a history that originates from the print world. Such documents essentially describe exactly where ink goes on a display page. For example, such fixed-layout formats instruct a printer or display screen exactly where on the display page to draw the letter "C," or where to draw the letter "H," or where to draw a line, or where to draw a curve. Such letters are defined in the fixed layout to be in a certain location relative to each other regardless of a size of the printed content.

A common and popular example of a fixed-layout file format is the Portable Document Format (PDF). PDF is a file format created by Adobe Systems Incorporated of San Jose, Calif., U.S.A. PDF is an open standard that was officially published on Jul. 1, 2008 by the International Organization for Standardization (ISO) as ISO 32000-1:2008.

Computer systems are capable of presenting information or content to people in a variety of ways. As an example, modern computer systems can present content to users such as playing movies or other multimedia presentations, displaying web pages, slide shows, text presentations, animations, audio or music, video games and the like. Prior to being displayed, a content developer, publisher or author creates the content using one or more software application programs that provide an authoring environment designed specifically for purposes of content creation. As an example, word processors allow an author to create text content, web page development applications provide an authoring environment to allow an author to create web pages, and multimedia authoring applications allow content authors to create video, animations, and other types of interactive content. Generally then, authoring environments are software programs that operate on computer systems and allow people (i.e., authors and publishers) to create, transform, or author creative content. Computerized authoring environments provide authoring features, elements, or toolkits within a user interface for viewing and creating content and storing such content. For example, some authoring environments provide toolkits to enable people to create content such as software application, simulations, websites, movies, audio or music or multimedia content.

In some graphical applications a viewport is the visible portion of a two dimensional (2D) area in a fixed layout document or page that may be larger or smaller than the visualization device. The viewport is navigated, scrolled and/or paged via a pointing device, such as a mouse, touchpad or trackball, to select, activate, and provide input to the application. Accordingly, a user can navigate and view different content regions via movement of a pointing device or keyboard.

A viewport can be zoomed to display content regions at various sizes. Increasingly, mobile devices such as PDAs, laptops, and cellular telephones are being used for presenting content to users. Such content is anything that can be viewed on a display screen. For example, such content includes published magazines which are now made available for viewing on mobile devices. Users typically scroll through a display page horizontally and vertically across the screen to reveal successive content.

Certain conventional software applications operate within a computer system to allow users to manipulate a scroll bar, a keypad or a touch sensitive screen to view and browse content. For example, in a word processing application, a document may consist of multiple pages, yet the word processing application's current settings provide a view of a single page at a time. In order to view other pages, a user can manipulate a scroll bar, press directional keys or swipe a finger across a touch sensitive screen to view pages that occur after the currently visible page or before the currently visible page. In another example, a current view of a browser application may not be big enough to create a complete view of an entire web page. In order to view all the web content presented on the web page, the user can manipulate the browser application's scroll bar upwards and downwards or left and right to view various portions of the web page. Users can also change the text size by manually adjusting a zoom level.

BRIEF DESCRIPTION

In certain conventional display applications, users scroll around content on a page to display portions of the content on a display screen. Unfortunately, conventional viewport scrolling and/or panning techniques suffer from several shortcomings and a number of deficiencies. For example, one problem with scrolling through and viewing fixed layout documents in conventional systems is a requirement for a significant amount of zooming in and out while reading the content in a viewport and then having to pan around the document to continue consuming content once finished with the content that is visible in the viewport. When viewing a fixed layout document, the components within the document are not reflowed or re-rendered based on the available viewport size.

As is often the case with certain text-based documents, the columns of text will reflow from the bottom of a display page to the top of the display page, requiring a lot of panning left to right and up and down to view different portions of the content. In certain cases, depending on what is being viewed, it may be necessary to zoom in and out in addition to scrolling or panning in order to see symbols such as text or details in images.

One approach to viewing a fixed layout document is to zoom back out to view the entire document, and then zoom back in to the top of the next column to view such a content region. In some cases, it is possible to zoom in too far. Further, it may be difficult to orient the viewport and identify where the text continues.

Depending on the content regions, such conventional panning and zooming rapidly becomes tedious and inefficient. For example, users may have to pan across a substantial number of columns in a document to find viewable or readable content of interest. The user may have no idea where a next section of related content is located on a displayed document. Techniques discussed herein may significantly overcome the challenge of scrolling from one content region to another by navigating through content regions according to a logical flow, resulting in content navigation which is easier on the eyes, quicker, and more intuitive.

For example, as will be discussed later in this specification, one advantage of techniques disclosed herein is that a user can easily view content regions of a display page on a display screen, without excessive amounts of manual scrolling, panning and zooming. One embodiment includes generation of a content region hierarchy based on content in a document. The hierarchy can define a logical flow of content regions in the document as well as or alternatively provide authored indications of relative text size which allow skipping over content which is not easily viewed or read on a particular device. Further, various embodiments described herein enable content to be presented in a vertical (or horizontal), readable layout that can be by viewed by navigating in one direction and following a logical flow.

More specifically, one particular embodiment of the present disclosure is directed to a technique that includes defining a logical flow of multiple content regions in a display page, initiating display of a first content region of the multiple content regions according to a first zoom level. In response to receiving navigation input in the display page to view a next content region following the first content region in the logical flow, embodiments herein include identifying a second content region—the second content region follows the first content region in the logical flow. Embodiments herein further include analyzing parameters of the second content region to determine a second zoom level for viewing the second content region and initiating display of the second content region according to the second zoom level, the second zoom level being different than the first zoom level. Such instructions, methods, systems, etc., as described herein, when carried out by a processor of a respective computer device, cause the processor to operate as explained in accordance with the processing described herein.

Embodiments herein can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a viewport navigator, authoring tool, and/or related functions as explained herein to carry out different embodiments as described herein. One such embodiment comprises a computer program product that has a computer-storage medium (e.g., a tangible computer readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable storage. As its name suggests, the computer readable storage medium can be any storage medium or media such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, another particular embodiment of the present disclosure is directed to a computer program product that includes one or more computer storage media having instructions stored thereon for supporting operations such as identifying a logical flow of multiple content regions in a display page and in response to receiving navigation input in the display page to view a next content region following the first content region in the logical flow identifying a second content region, the second content region following the first content region in the logical flow, analyzing parameters of the second content region to determine a second zoom level for viewing the second content region. The instructions, and method as described herein, when carried out by a processor of a respective computer device, cause the processor to perform the methods disclosed herein.

Another aspect of the present disclosure is directed to a technique that includes receiving a display page having a fixed layout of displayable content and identifying a plurality of content regions in the display page. The technique further includes detecting a request to navigate a viewport from a first content region to a different second content region. The second content region can be analyzed by a display function in order to determine how the second content region should be resized in the viewport.

Other embodiments of the present disclosure include software programs to perform any of the method embodiment steps and operations summarized above and disclosed in detail below. Of course, the order of discussion of the different steps as described herein has been presented for clarity sake. In general, these steps can be performed in any suitable order.

Also, it is to be understood that each of the systems, methods, and apparatuses herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting viewport navigation such as viewing on-line magazine publications. It should be noted, however, that embodiments herein are not limited to use in such applications and that the techniques discussed herein are well suited for other applications as well. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIGS. 8-15 are flowcharts illustrating an example processes supporting navigation, document processing, and navigation according to embodiments herein.

DETAILED DESCRIPTION

One embodiment herein includes a computer system and/or display application in which a viewport navigator renders a view of a portion of a fixed layout document. The viewport can be navigated through a hierarchy of content regions to view different content regions. The hierarchy of content regions defines a logical flow or interconnectivity of different portions of content as provided by document authoring operations. In other words, an author can define regions, sub-regions, etc., in a document and thereafter define how the content regions of the document can be navigated via input from a source such as a computer mouse, keyboard, etc.

Figure 1:
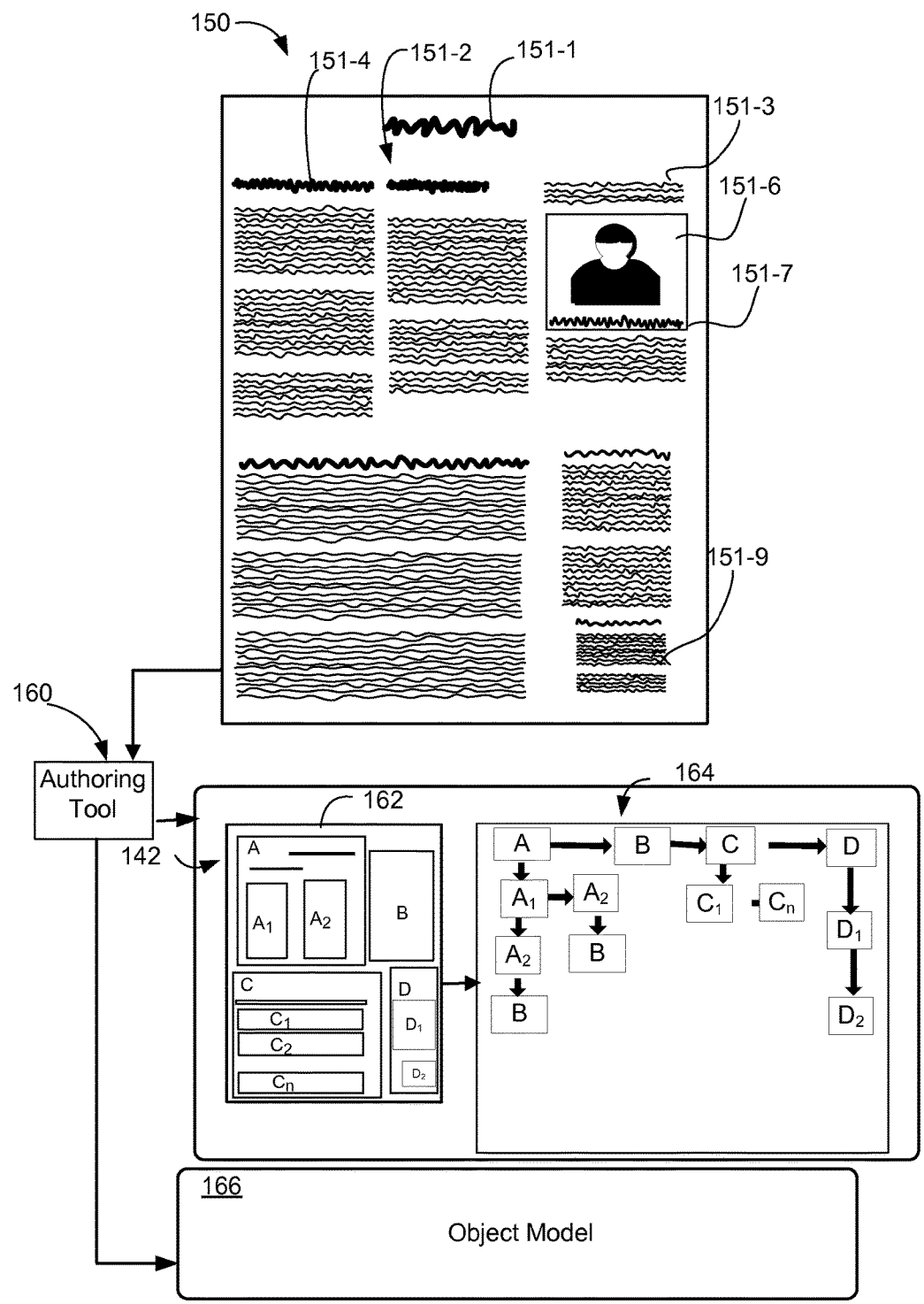
FIG. 1 is an example diagram of display page having a content region hierarchy and defined logical flow of multiple content regions in a computer/network environment according to embodiments herein.

Now, more specifically, FIG. 1 is an example diagram of a display page 150 having a fixed layout. Use of the term fixed layout in one example embodiment means that the content within the document is not re-flowed based on its size relative to the viewport's size (e.g., at arbitrary zoom levels, the content does not reflow).

Within display page 150, there several graphical and textual elements including but not limited to title 151-1, columns of text 151-2, heading 151-3, headline 151-4, image 151-6, an image caption 151-7, and text 151-9. The text 151-9 can be smaller in size compared to a size of other text in the document. Depending on a size of a display screen in which the display page 150 is rendered, it may be possible to discern some content regions within display page 150 but not others.

In order to facilitate navigation through the display page 150 according to embodiments herein, a content region hierarchy 162 is defined either at authoring time or runtime (i.e., when the display page 150 is about to be display on a display device).

At authoring time, the process of defining the different content regions within a hierarchy 162 is accomplished either manually or automatically. For example, an analyzer, human or machine, can be configured to analyze content within the display page 150 and create different levels of logical content regions.

Content region A in content region hierarchy 162 indicates a region of related content in display page 150. Content region A1 indicates a sub content region within content region A. Content region A2 indicates a sub content region within content region A.

Content region B in content region hierarchy 162 indicates another distinct region of related content in display page 150.

Content region C in content region hierarchy 162 indicates another region of related content in display page 150. Content region C1 defines a sub content region within content region C. Content region C2 defines a sub content region within content region C.

Content region D in content region hierarchy 162 indicates another region of related content in display page 150. Content region D1 defines a sub content region within content region D. Content region D2 defines a sub content region within content region D, and so on.

Thus, each of the content regions, sub content regions, etc., can be further divided to define yet deeper levels of the content region hierarchy.

As mentioned above, a viewport such as a window of a display screen can be used to view a fixed layout document such as display page 150. According to conventional methods, the viewer can manually provide input indicating which portions of the display page 150 will be displayed in the viewport. After scrolling or panning to particular location in the display page 150, a viewer can manually input zoom commands to either increase or decrease a size of content displayed in the viewport.

In contrast to conventional techniques, as discussed in more detail below, a viewer is able to navigate within the display page 150 and view different content regions via input of navigation commands. For example, a viewer can initiate display of the display page 150 in a window. In response to selection of navigation input such as clicking a down arrow on a keypad, embodiments herein include zooming into and panning within the display page 150 to display content region A in the viewport. In response to additional selection of navigation input such as clicking the down arrow again, embodiments herein include zooming into and panning within the display page 150 to display content region A1 in the viewport. If the content region A1 is not completely displayed in the viewport, clicking of additional down arrows on the keypad results in scrolling (also referred to as paging) through content region A1. Eventually, it will not be possible scroll any further down in the content region A1. In response to detecting further input such as clicking on the down arrow, embodiments herein include initiating display of content region A2 in the viewport. A viewer is then able to scroll down content region A2.

In response to detecting further input such as clicking on the down arrow again while scrolled down to a bottom of content region A2, embodiments herein include initiating display of content region B in the viewport. Display of content region B in the viewport or window of a display screen can include panning and rezooming within the display page so that only content region B is sized to fit into the viewport.

Also, if a user happens to be viewing a top of a column of content region A1 and does not wish to scroll down to the bottom of content region A1, a user can select a right arrow button on a keypad to bypass scrolling down content region A1 to immediately view a top of content region A2. Thus, different directional keypads can be used to traverse different levels of the content region hierarchy. For example, up and down arrows of the keypad can be used to navigate deeper within the logical flow while the side arrows can be used to traverse across content regions at the same level of a the content region hierarchy.

Thus, according to embodiments herein, navigation input such as arrows that are conventionally used for panning in a document are instead used to traverse different content regions of a document depending on a content region hierarchy associated with a display page.

The content region hierarchy thus can be defined as follows:

```
content region A
    content region A1
    content region A2
content region B
content region C
    content region C1
    content region C2
content region D
    content region D1
    content region D2
...
```

Thus, as mentioned above, a user can provide input such as repeatedly clicking a down arrow button to navigate through the display page. For example, sequential clicking of the down arrow button results in display of content region A, followed by a display of content region A1, followed by a display of content region A2, followed by a display of content region B, followed by a display of content region C, followed by a display of content region C1, followed by a display of content region C2, followed by a display of content region D, followed by a display of content region D1, etc. Thus, the display application according to embodiments herein zooms and pans accordingly upon receipt of each navigation command. As mentioned above, selection of the down arrow while viewing content region A1 can result in a visual display of panning from content region A1 to content region A2.

In certain cases, a viewer may desire to skip over viewing sub content regions. To facilitate such functionality, a user can apply additional input such as holding down a shift key to prevent zooming down into the sub content regions. For example, a user can continuously press a shift key and then click on a down arrow to pan and view content region A, followed by a display of content region B, followed by a display of content region C, followed by a display of content region D. At any time a user can discontinue pressing the shift to allow zooming down and viewing different sub content regions as discussed above. Thus, a user is able to navigate through different levels of the content region hierarchy depending on navigation commands inputted by the user.

Note that the content in each of the regions can be sized differently. For example, text in content region D1 can be 12 point font while text in content region D2 can be 9 point font. When navigating amongst content regions in the display page 150, embodiments herein can include resizing of the content region in the viewport or window such that the text and/or symbols in each of the sub content region D1 and sub content region D2 is displayed as substantially the same size. In such an embodiment, the user does not have to manually resize the content so that it can be viewed.

Yet further embodiments can include a search function in which a respective viewer is able to select which type of content in the display page 150 the viewer will view. For example, suppose the user would like to view articles pertaining to golf. In such an embodiment, the display application can traverse the content region hierarchy and related content to identify which content regions in the display page include information about golf. As a result of the search, assume in this example that the search engine identifies that content region A1, content region A2, content region C1 and content region C2 include information about golf such that a newly derived hierarchy for the search is as follows:

```
content region A
    content region A1
    content region A2
content region C
    content region C1
    content region C2
```

The user will now be able to traverse the newly derived content region hierarchy to view golf articles without having to view undesirable content such as content region B, content region D, content region D1, and content region D2. For example, the user can repeatedly click an down arrow key (of a set of keypads or displayed symbols on a display screen) to view content region A, followed by c followed by content region A1, followed by content region A2, followed by C, followed by content region C1, followed by content region C2.

For clarity in the following figures, multiple content regions are referred to individually as content region $142X_i$, for example 142A, $142A_1 \ldots 142D_1$, and generally referred to as content regions 142. A content region 142 can include one or more of the elements 151 described above. For example, content regions 142 can include any of words, sentences, paragraphs, images, lines, and so forth. In one embodiment, content regions 142 can be thought of as graphically fixed rectangles of defined pixels in the display page 150 that represent different content elements 151.

For example, FIG. 1 depicts a display page 150 having several columns. If the entire display page 150 were resized by a computing device to fit on a smaller screen, there would still be the same number of columns of content. Depending on the size of the smaller screen, portions of the document would be non-readable because the resized text is too small.

In operation, to define the content regions 142, an authoring tool 160 defines the shape and number of content regions 142 based on input from an author, publisher, editor, layout artist or automatically from an authoring tool such as those described below. The different regions in a hierarchy can be selected by an author and highlighted to indicate each content region. Additionally, each sub-content region can be highlighted within a display page such that the author can identify partitioned content regions within a display page.

The authoring tool 160 also can be used to specify an ordering such as a logical flow of the visible content regions defining logical flows through the content regions 142. For example, an author can define a flow of content as defined by the content region hierarchy as discussed above. Thus, using the authoring tool a publisher, for example, can designate areas of interest to be included in a specified order in the logical flow to aid in navigation through the content of a display page. The content regions can be tagged for searching and displaying content regions of interest.

The resulting logical flow or content region hierarchy is used in conjunction with a viewport navigator 140 (FIG. 2), to display content regions on a display device. In further embodiments, the authoring tool 160 can also provide information related to the viewability or readability of content regions by indicating relative text size, image size or other characteristics about the particular content region, for example, whether certain features of a symbol or image can be distinguished at a particular zoom level.

Returning to FIG. 1, in one embodiment, content regions 142 can overlap and can be arranged in the content region hierarchy 162. Several content regions are labeled A, B, C and D to aid in explaining how the viewport navigation process operates.

The content hierarchy 162 is used to provide a logical flow of multiple content regions as represented by flow diagram 164. By way of a non-limiting example, the logical flow could be embodied an array, a list, a tree, content region hierarchy, document object model, etc. The logical flow structure can be serial or hierarchical as shown here with content regions 142A$_1$ and 142A$_2$ being subsets of content region 142A.

In one example embodiment, the logical flow is stored in a display page document object model (DOM) 166. In addition to determining the logical flow, the authoring tool 160 can be used to determine the viewability and readability of content regions 142. Exemplary XML meta-data tags describing content regions, here in a Flash document are listed below:

```
<content>

<contentArea textSize='16'>
      <rect x="42.1" y="17.8" width="379.95" height="435.25"/>
    </contentArea>
    <contentArea type='text' textSize='12'>
        <rect x="41.25" y="107.45" width="69.15" height="342.05"/>
    </contentArea>
    <contentArea type='text' textSize='12'>
        <rect x="115.95" y="107.45" width="69.149"
        height="342.05"/>
    </contentArea>
    <contentArea type='image'>
        <rect x="187.3" y="107.45" width="69.149"
        height="342.05"/>
    </contentArea>
    <contentArea minTextSize='12'>
      <rect x="267.05" y="107.45" width="69.149" height="342.05"/>
    </contentArea>

</content>
```

As previously discussed, a determination of readability can at least partially depend on the font size, characteristics of the display, dots per inch (DPI), and the assumed distance the user will be from a corresponding display device rendering part or all of the display page 150. This determination can be made either at author-time or runtime with data stored in an object model 166 of the content regions 14.

By way of a non-limiting example, a content region might include 12 point font text, and an author might determine that this text is only readable at a 9 point font and that the text shouldn't get any bigger than 18 point text. If a user were browsing through the content region with the viewport scaled to 50%, the viewport would render the text as 6 point text and would be too small to read. So this content region would be skipped during navigation. Thus, content regions can include symbols of different size. Embodiments herein can include rezooming such that the symbols are displayed of substantially the same size when traversing the different content regions and displaying them on a display screen. In an alternate embodiment, the content region is displayed in a window based on a larger zoom factor, so that the text could be read, even if scrolling is required to read the text within the content region.

In one embodiment, it is possible to limit the zoom level to a predetermined maximum zoom level. For example, if the viewport was zoomed to 400%, the text would be rendered as 48 point text, and would be too big to efficiently read because excessive navigating and/or scrolling would be required. The zoom levels can be determined based on how the content region fits into the viewport.

Three are several ways to specify content regions including: (i) manual specification of content regions at authoring time; (ii) use of design tools such as Adobe® InDesign™ that examines page layouts and provides suggestions about the location of content regions; and (iii) runtime processing of document object models (DOMs) by inferring a reading order from tags in a DOM and logical flow through content regions from HTML content. In another embodiment, image processing techniques are used to infer the structure of a document (e.g., columns of text headlines, etc.). The image processing can be incorporated at author-time or runtime.

It is also possible to determine content regions and logical flows from the structure of some multi column formatted text without authoring the document. At author-time determination can be made manually or automatically to indicate font size so that at run time the effective size of the displayed font in a viewport can be calculated. Also a determination can be made manually or automatically to indicate whether a content region 142 includes text or image content.

In one particular embodiment, an image/caption hierarchy is used to allow content regions to separately include an image and a caption for the corresponding image. This advantageously allows the user to navigate to a fine print caption and easily view the caption at an automatically increased zoom level greater that used to view the image.

An automated authoring tool such as that described in U.S. patent application Ser. No. 12/252,626 filed Oct. 16, 2008, now U.S. Pat. No. 8,539,342, entitled Order Inference By Content Sorting, can also be used to automatically provide a content region hierarchy 162 for the content regions 142 in the display page and assist in determining the logical flow 164. This application is incorporated by reference in its entirety. For content regions considered "non-text", an authoring tool, Adobe® InDesign™ for example, could 20 provide viewability information at author-time.

Viewability information can indicate how large symbols in a content region are to be displayed on a display screen. Such viewability information can also be, for example, specified at author-time. Thus, when navigating through a logical flow, an amount of zooming within a content region can vary depending on a size of a viewport or window.

Figure 2:
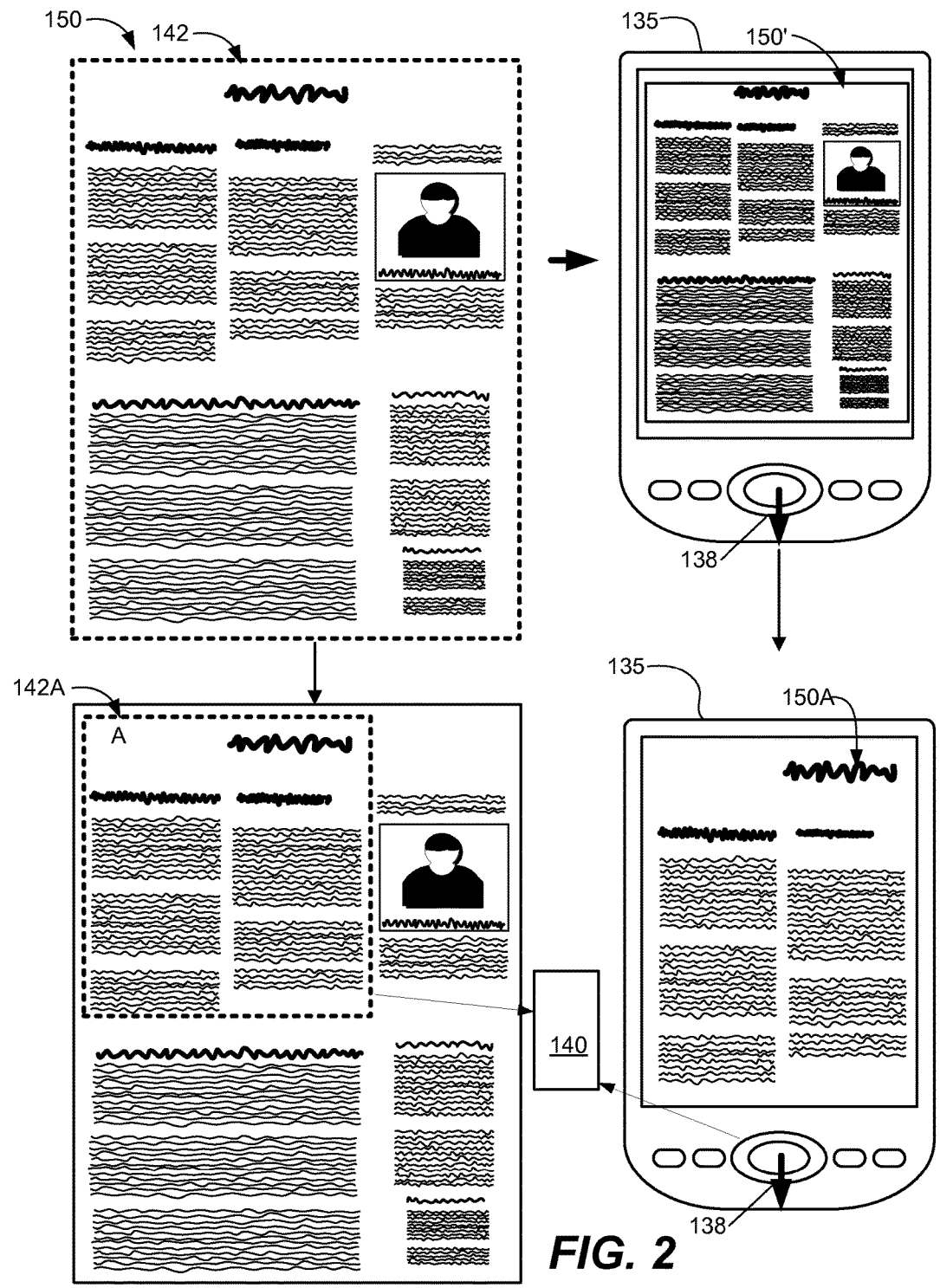
FIG. 2 is a diagram of an initial display page display in a viewport of a display device and a display of content according to a first zoom level following navigation to a content region according to embodiments herein.
Figure 3:
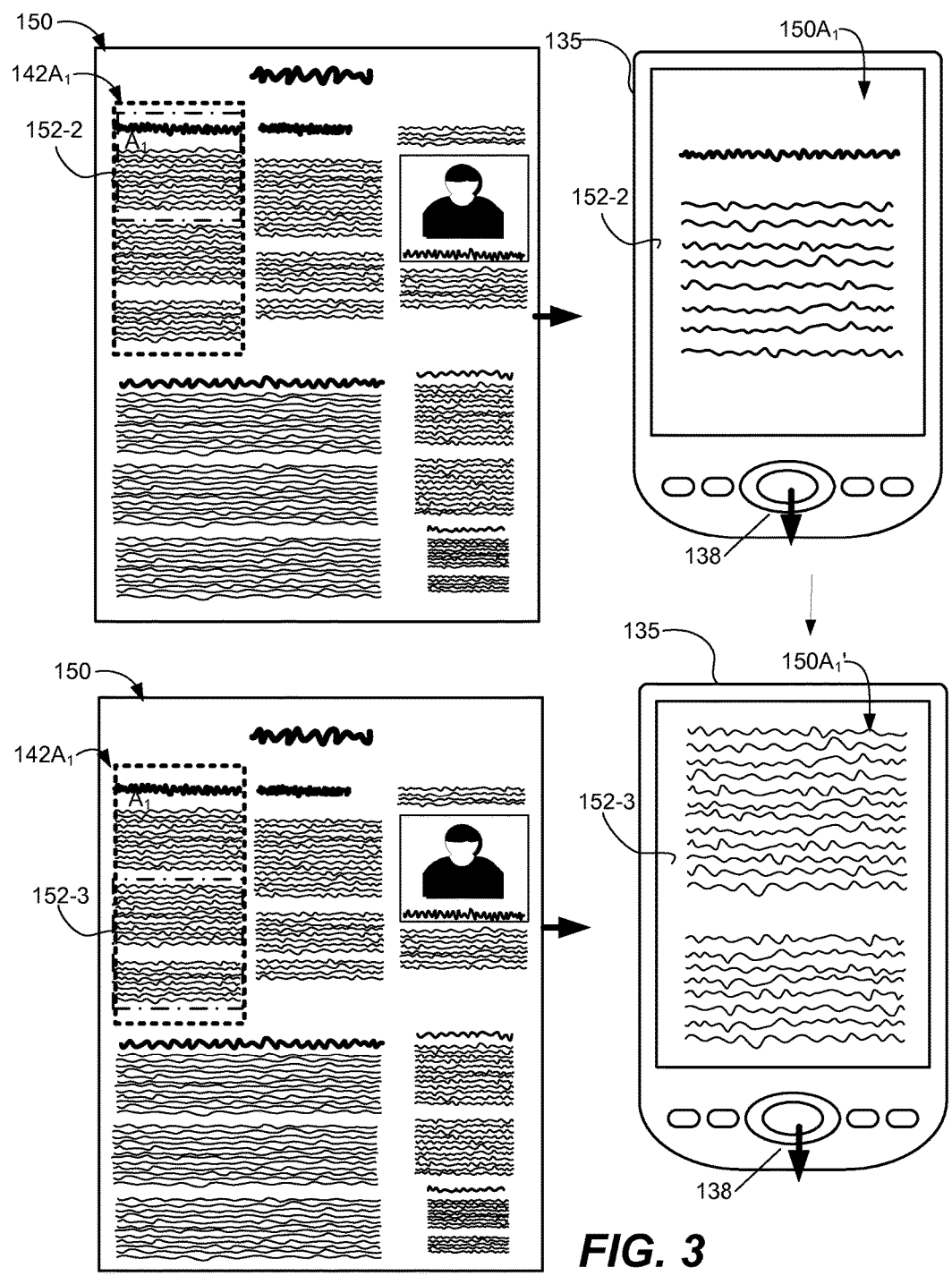
FIG. 3 is a diagram of displayed content regions in a document according to the first zoom level of FIG. 2, on a display device generated by paging down through a single content region in the defined logical flow of FIG. 1 according to embodiments herein.

FIGS. 2-6 illustrate exemplary displays (labeled 150X$_i$) on a display screen 135, resulting from user input to navigate through display page 150 under control of a viewport navigator 140, which uses the authored content region hierarchy 162 and logical flow 164 of FIG. 1. More specifically, FIG. 2 illustrates the example document 150 being displayed on a computing device, such as a display screen 135. As shown, display page 150 in initial viewport is resized as display page 150' on a smaller screen of display screen 135 and includes all content regions 142 in the display page 150. In response to input from the user, here input to navigate down using navigation button 138, the viewport navigator 140 determines from the logical flow 164 in the object model 166 the logical flow of the viewport from the initial display page to content region 142A at a new, here higher, zoom level. Accordingly, as a user traverses the logical flow, the amount of zoom (also referred to as zoom level) is determined based on matching the content region's width with the viewport's width. In alternative embodiments, based on user input, the viewport navigator 140 can navigate the viewport to content region 142A which happens to be at a top level of the content region hierarchy and zoom the viewport in to match the width of content region 142A. As a result, content region 142A will be displayed as display 150A on the display screen 135 at a zoom level different than the initial zoom level. In this example the text size in display 150A will appear larger than the initial display 150'. The user then continues to navigate through content region hierarchy to content region $142A_1$ as shown in FIG. 3 without scrolling or panning, but by generating a single navigate down request (e.g., by pressing or inputting a down arrow command).

The viewport navigator 140 navigates and zooms to match a width of selected content region and in one embodiment uses a maximum zoom factor of three. Zooming is also based on the size of the text to ensure readability. In an alternate embodiment, the viewport navigator 140 zooms the entire content region 142A proportionally (i.e., where width and height are scaled equally) so that the content region fits inside the viewport.

In one embodiment, which is targeted to western languages and readability, the amount of zooming can be determined so that the width of the content region takes up the majority of the viewport width. In some embodiments additional padding (e.g. whitespace) surrounds the displayed content region. Additionally, the zooming level may be limited by certain factors, such as text readability as described below in conjunction with FIGS. 5 and 6.

In other embodiments, content regions are scaled so that the height matches that of the viewport's height, so that navigation would take place horizontally. An example of that would be a landscape image. The determination of whether to match the width or height is usually determined by the content region's aspect ratio. Landscape content regions are matched according to heights. Portrait content regions match widths.

In addition to determining the next content region 142 in the logical flow and the appropriate zoom level, the viewport navigator 140 executes processing steps to analyze the viewability and readability of content regions. In addition to the object model 166, the viewport navigator 140 can incorporate user settings and parameters that are used to analyze content regions 142 for viewability and readability. Parameters of the content region can include metadata indicating size information associated with the content region, size information associated with symbols within the content region, etc. In one non-limiting embodiment, the corresponding zoom levels are dependent on the ratio of the size (width) of the window relative to the size (width) of the content region.

In one embodiment, a user may specify a minimum font size that the user determines to be readable. For example, one user may read 12 point font as rendered on a display screen, but another user with impaired vision would need an 18 point or greater font size.

In another embodiment, a relative setting, such as 'Small', 'Medium', 'Large', could specify different minimum displayed font settings used by the viewport navigator at runtime, or incorporated in the content region object model by the authoring tool.

In one embodiment, the viewport navigator 140 operates in conjunction with the Adobe® AIR™ runtime system which enables the viewport navigator 140 to operate as a web applications but without a web browser. In other embodiments the viewport navigator 140 can operate in conjunction a web browser.

Figure 4:
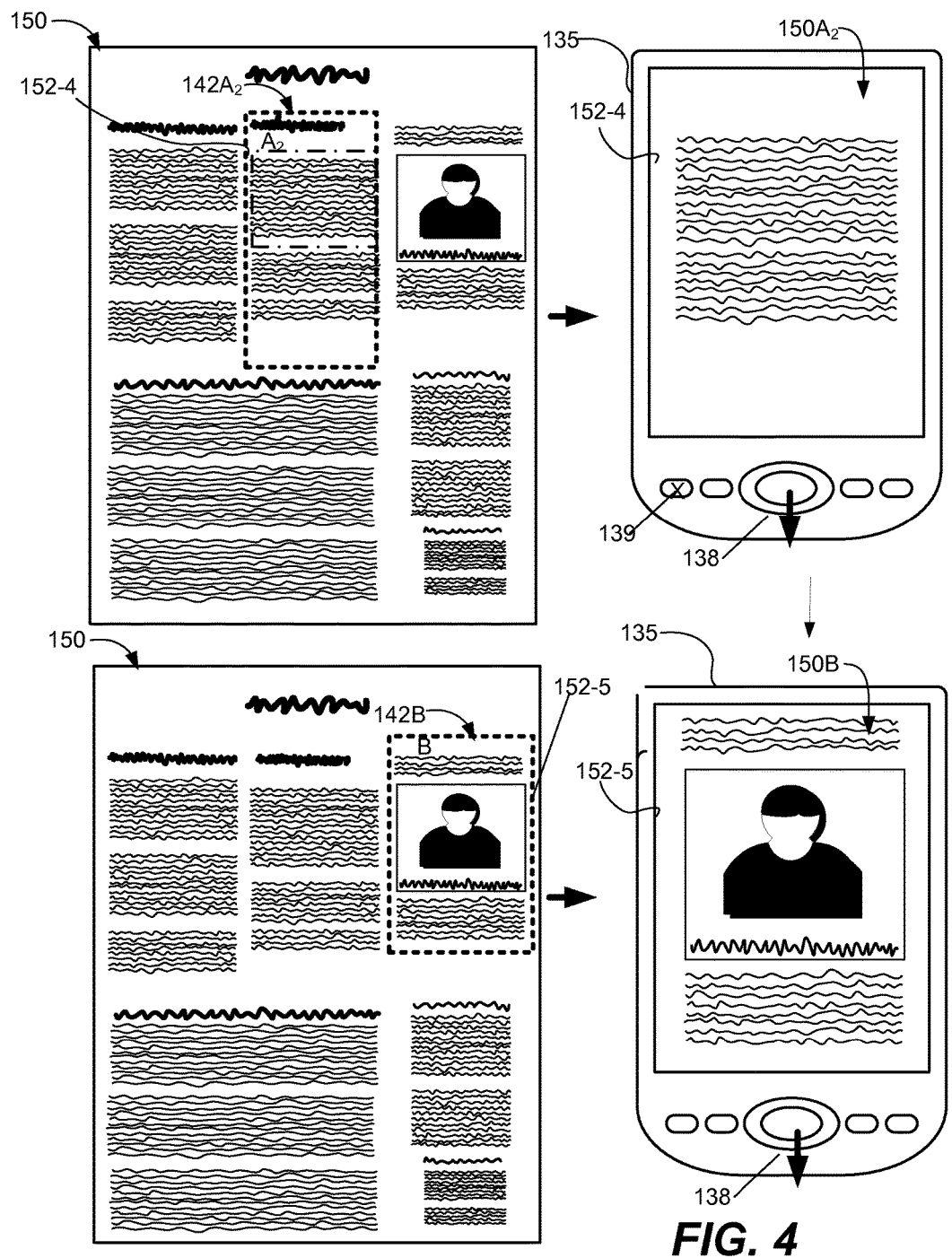
FIG. 4 is a diagram of a display device displaying a second content region following the displays of the content region of FIG. 3 according to a second zoom level, the second zoom level being different than the first zoom level according to embodiments herein.

FIGS. 3 and 4 show a diagram of further navigation of the viewport through the exemplary display page 150. FIG. 3 shows the viewport initial at the top of content region $142A_1$ after navigation from content region 142A (FIG. 2). FIG. 3 further shows the viewport scrolling down in content region $A_1$ from a first position indicated by content 152-2 to a next position 152-3 in content region $A_1$ in response to receiving navigation input, here user input for paginating through content region $A_1$ by, for example, pressing navigate down on the navigation button 138. In response to the navigation request, the viewport navigator 140 then causes display device 135 to display the content 152-3 at the same zoom level as content 152-2. In this situation, where the viewport's width is scaled so that the viewport's width matches that of the content region $A_1$, and the height of related content doesn't fit in the viewport, the user scrolls through the height of the content region. Display device 135 displays content 152-2 and 152-3, according to a first zoom level scaled to readably fit the content region on the display screen 135 as displays $150A_1$ and $150A_1'$. Here pagination (in contrast to navigation) is used to indicate scrolling down (paging down through the content region) in a viewport size increment without moving the viewport outside the content region. For example, in this scenario, the down navigation control is used to scroll or page down within a given content region. The size increment, which can be computed at run time, is used to control paging down when the viewport is, for example, shorter in height than the content region. Thus, according to embodiments herein, a selectable input or selectable button such as a keypad, icon on a display screen, etc., can be used for dual purposes. For example, a first use of the selectable input can be used to skip from one content region to another content region in a document. If the content region skipped is not or cannot be displayed in its entirety in a viewport or display window, additional selections of the selectable input can cause scrolling down within a particular content region already at least partially displayed in the viewport. After scrolling down to a bottom of a particular content region being viewed, an additional selection of the selectable input can cause navigation to a next content region in the logical flow as described herein.

Accordingly, one embodiment herein includes initiating display of a first portion of a given content region in a window in response to selection of a selectable button. In response to receiving additional navigation input such as selection of the button again, embodiments herein include initiating scrolling down in a content region and displaying a second portion of the given content region in the window. Thus, first navigation input inputted by a user to display a particular content region and subsequent, second navigation input to scroll down in the particular content region can be generated in response to selection of a same navigation button such as a down arrow on a keypad. A function of the keypad or input command generated by the keypad can therefore vary depending on what particular portion of a content region is being viewed at a particular time when the button is clicked.

An alternate embodiment herein includes displaying a first portion of a given content region according to a zoom level, receiving further navigation input to view content, paging the viewport within the content region in response to identifying a second portion of the content region outside the viewport. The identification of remaining un-displayed content can be accomplished by comparing a dimension of the viewport with a corresponding dimension of the second content region, for example the height, to determine that there is un-displayed content in the given content region. The second portion of the given content region is displayed according to the zoom level used to display the first portion.

The user then continues to navigate through content region hierarchy 162 according to the logical flow 164 to content region 142A$_2$ as shown in FIG. 4 again without scrolling or panning, but by generating a single navigate down request. Here although the user pressed the navigate down button to leave content region 142A$_1$ the viewport actually navigates upward and to the right to a different area of the display page 150 and the zoom level is changed to properly display content region 142A$_2$ scaled to fit on a small screen.

FIG. 4 shows an example diagram of navigation from content region 142A$_2$ which is a sub-level of content region 142A in the content region hierarchy 162 to a content region 142B at a higher level in the content region hierarchy 162 without paging the viewport further down in content region 142A$_2$. As described above, the up and down arrow keys on a keypad or navigation button are used to navigate over the display page 150. In this example a shift key can be used to alter the operation of the up and down arrow keys, for example to jump past a content region where the viewport is paging through a single content region.

Here, the viewport over content 152-4 would normally page down from content 152-4 to additional content encompassed by content region 142A$_2$ below content 152-4 in response to receiving navigate down navigation input. However, assume in this example that the user presses a shift button 139 in conjunction with the navigate down control on the navigation button 138 to skip paging down in content region 142A$_2$ and instead navigates the viewport using the logical flow 164 through the hierarchy to move over to and zoom in to content region B. With the viewport over content region 142B, the display screen 135 displays the image, text, and caption as display 150B at possibly a different zoom level than that used for preceding content region 142A$_2$. Thus, the user can navigate through the display page 150 without conventional scrolling and panning or paging down columns and can rapidly navigate through various levels of the hierarchy 164.

In one embodiment, a small caption 151-7 for the photo image 151-6 could be placed in a separate content region so the user could navigate to the caption content region to more easily view the caption. The user then continues to navigate through content region hierarchy to content region 142C as shown in FIG. 5 again without scrolling or panning, but by generating a single navigate down request.

Figure 5:
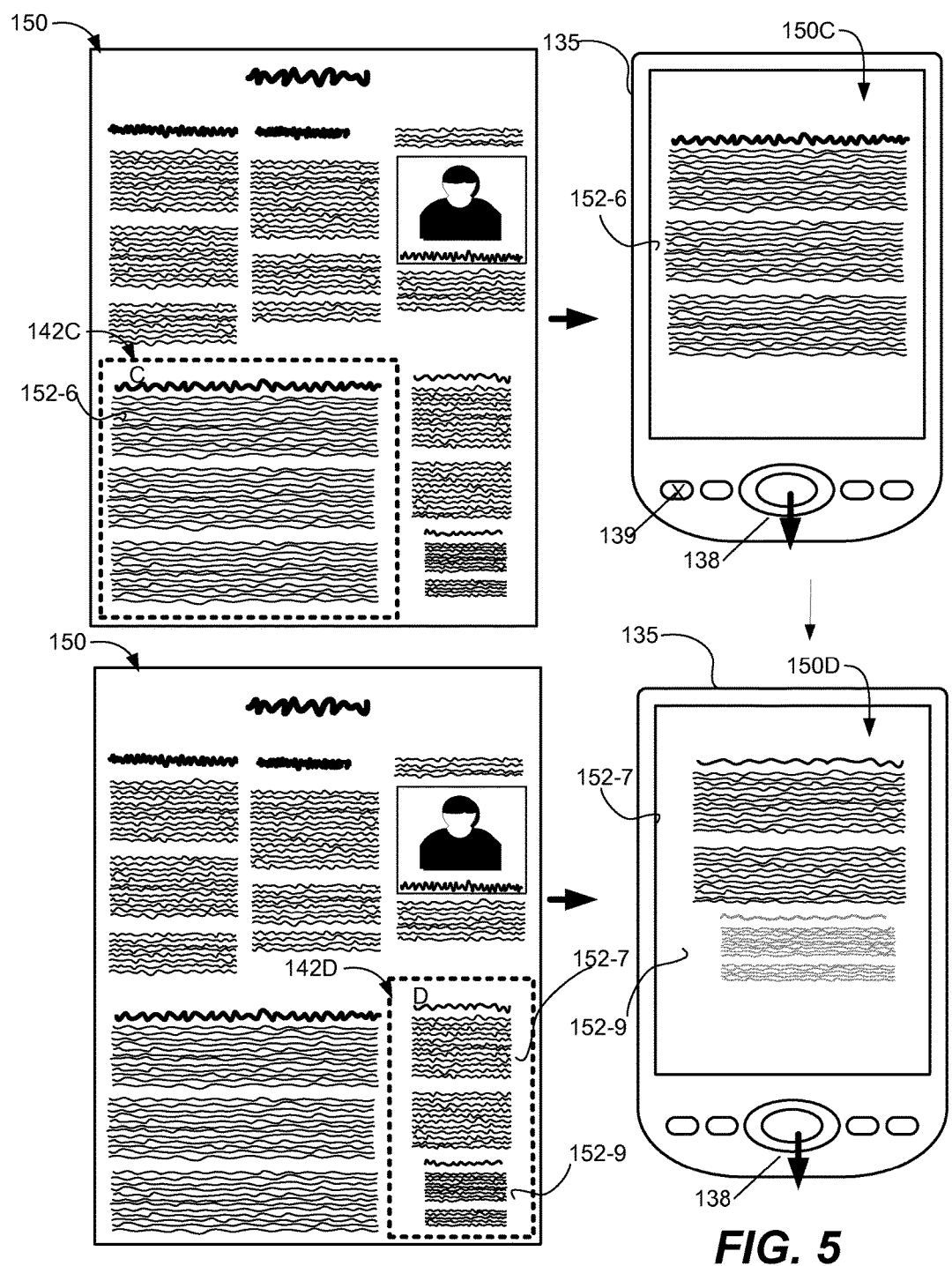
FIG. 5 is a diagram of a mobile device displaying content regions including a content region that includes highlighted non-readable content according to embodiments herein.

FIG. 5 shows an embodiment where the user navigates (again by using the shift button 139 in conjunction with the navigate down control on the navigation button 138) from content region 142C to content region 142D which includes both viewable and readable text 152-7 and text 152-9 which is not readable on the display of device 135. In one embodiment, the unreadable content 152-9 is highlighted (here, grayed-out) to indicate that the content is not readable (or if an image is not reasonably viewable) at a current zoom setting in the viewport on the display device 135. The highlighting can appear for a short duration before the viewport is navigated off content region 142D or content region 142D can be skipped over without any display. In an alternative embodiment, visible content regions are optionally highlighted. Another alternative embodiment causes content regions 142 to be visible only on rollover, indicating that a user could click on them to zoom.

Figure 6:
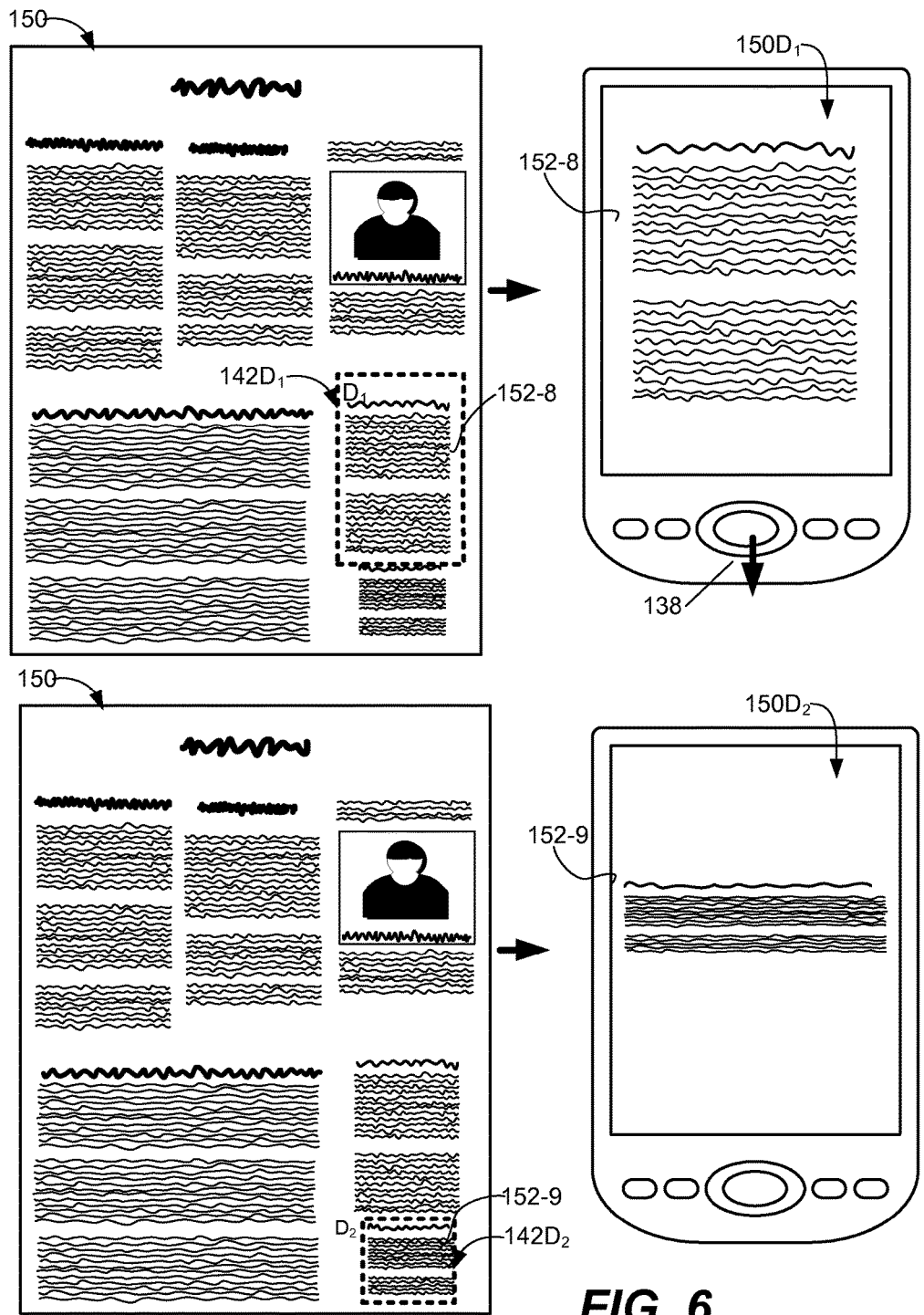
FIG. 6 is a diagram of a display after skipping over the non-readable content of FIG. 5 to a content region providing readability, according to embodiments herein.

FIG. 6 shows the viewport automatically navigated to content region 142D$_1$ in response to the analysis and determination by the viewport navigator 140 to navigate the viewport through unreadable content in content region 142D as described above in conjunction with FIG. 5. For some fixed layout documents created for print, the text size cannot be changed so a publisher might not know what is readable on a given device. In this situation a user setting for readability could be used by the viewport navigator. In alternate embodiments, the viewport navigator navigates over content regions that do not fit or navigates over content regions which include uninteresting content (e.g., as specified by user).

If at author-time an additional content sub-region D$_2$ was included in the content region hierarchy 162 and the logical flow 164, the user would be able to navigate the viewport to content region D$_2$ by navigating downward. Unlike content region D1, the viewport navigator determines that the text content 152-9 is readable in content region D$_2$, and the text 152-9 is displayed.

It should be noted that the viewport navigator 140 is not limited to text or Western writing systems. The same document editing process applies to vertical writing systems such as Chinese and Japanese. In the case of vertical text, that is text which is read top-to-bottom within lines and right-to-left between lines, the viewport navigator 140 can, for example, follow the logical flow as modified by user navigation input to display content regions. In other words, the document editing process is applicable to multiple text and image orientations.

Figure 7:
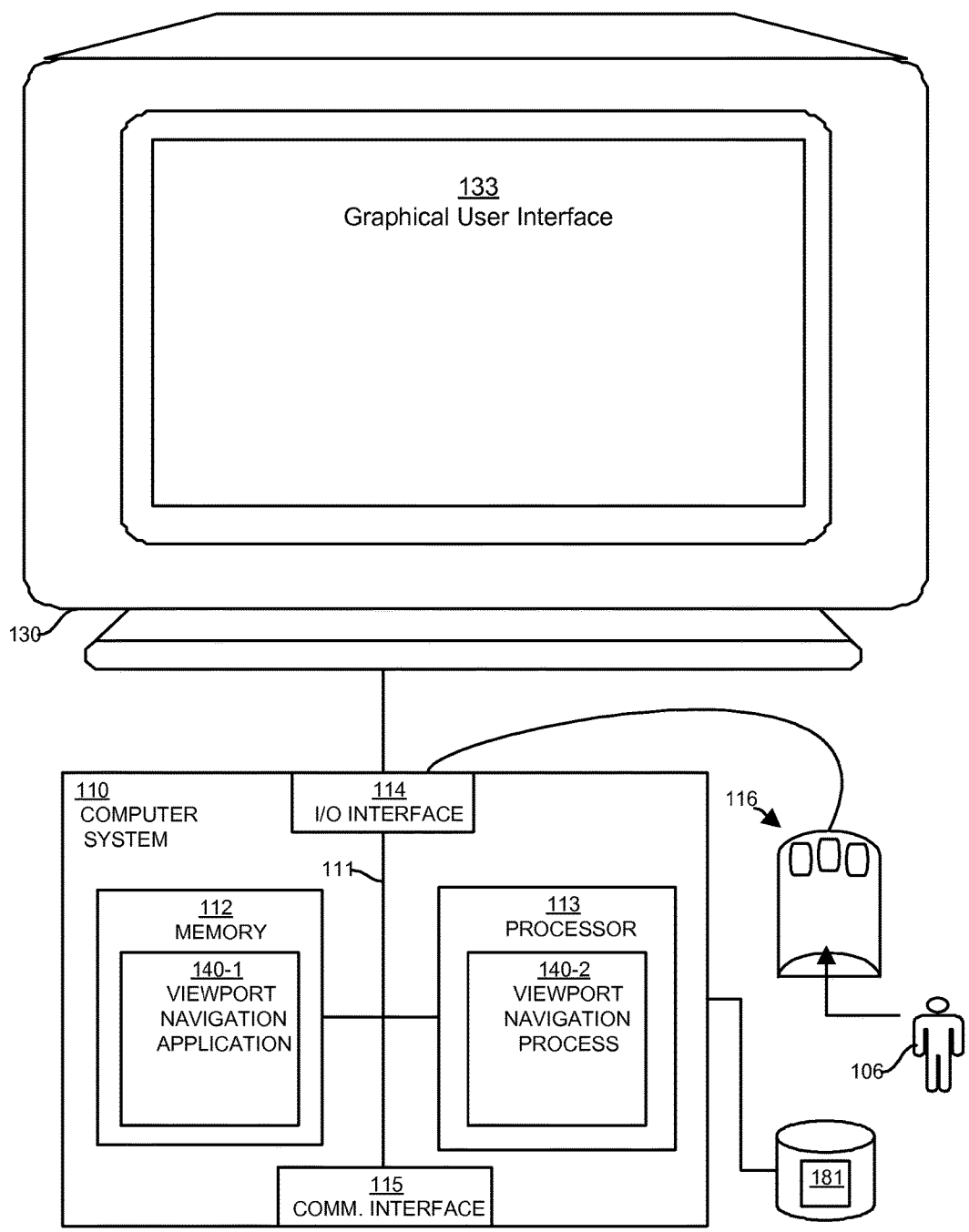
FIG. 7 is a block diagram illustrating an exemplary architecture of a computer system in a computer/network environment according to embodiments herein.

FIG. 7 is an example block diagram illustrating an architecture of a computer system 110 (similar to display screen 135) that executes, runs, interprets, operates or otherwise performs a viewport navigation process 140-2 (e.g. an executing version of a viewport navigator 140 as controlled or configured by user 106) according to embodiments herein.

Note that the computer system 110 may be any type of computerized device such as a personal computer, a client computer system, workstation, portable computing device, console, laptop, netbook, television set-top box, camera, camcorder, network terminal, etc. This list is not exhaustive and is provided as an example of different possible embodiments. In addition to a single computer embodiment, computer system 110 can include any number of computer systems in a network environment to carry the embodiments as described herein. Thus, those skilled in the art will understand that the computer system 110 can include other processes and/or software and hardware components, such as an operating system that controls allocation and use of hardware resources, or multiple processors.

As shown in the present example, the computer system 110 includes an interconnection mechanism 111 such as a data bus, motherboard or other circuitry that couples a memory system 112, a processor 113, an input/output interface 114, and a display 130. Repository 181 can optionally be used for storing documents and content both before and after processing. If so configured, the display can be used to present a graphical user interface of the viewport navigator 140 to user 106. An input device 116 (e.g., one or more user/developer controlled devices such as a keyboard, mouse, touch pad, touch sensitive screen, devices without keypads, speech input etc.) couples to the computer system 110 and processor 113 through an input/output (I/O) interface 114. The computer system 110 can be a client system and/or a server system. As mentioned above, depending on the embodiment, the viewport navigation application 140-1 and/or the viewport navigation process 140-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the viewport navigation application 140-1. Execution of the viewport navigation application 140-1 in this manner produces the viewport navigation process 140-2. In other words, the viewport navigation process 140-2 represents one or more portions or runtime instances of the viewport navigation application 140-1 (or the entire viewport navigation application 140-1) performing or executing within or upon the processor 113 in the computerized device 110 at runtime.

The viewport navigation application 140-1 may be stored on a computer readable medium (such as a floppy disk), hard disk, electronic, magnetic, optical, or other computer readable medium. It is understood that embodiments and techniques discussed herein are well suited for other applications as well. Those skilled in the art will understand that the computer system 110 may include other processes and/or software and hardware components, such as an operating system. Display 130 need not be coupled directly to computer system 110. For example, the viewport navigation application 140-1 can be executed on a remotely accessible computerized device via the communication interface 115. The display 130 presents a rendered graphical user interface 160 that provides a display of content regions. The viewport navigator 140 presents a display of content regions in response to navigation commands.

Note that the following discussion provides a basic embodiment indicating how to carry out functionality associated with the viewport navigator 140 as discussed above and below. However, it should be noted that the actual configuration for carrying out the viewport navigator 140 can vary depending on a respective application.

Functionality supported by computer system 110 and, more particularly, functionality associated with viewport navigator 140 will now be discussed via flowcharts in FIG. 8 through FIG. 14. For purposes of the following discussion, the viewport navigator 140 operating on the computing device processes input to navigate the viewport over the content regions 142 and a separate application or other appropriate entity performs authoring steps for authoring the display page 150 provides the content region hierarchy 162 to produce the logical flow 164 and indications of visibility and readability of the various content regions. The rectangular elements in flowcharts, for example 810 (in FIG. 8) denote "processing blocks" and diamond shaped element, for example 1220 (in FIG. 12) denotes a decision block, and both represent computer software instructions or groups of instructions upon a computer readable medium. Additionally, the processing blocks represent steps performed by hardware such as a computer, digital signal processor circuit, application specific integrated circuit (ASIC), etc.

Figure 8:
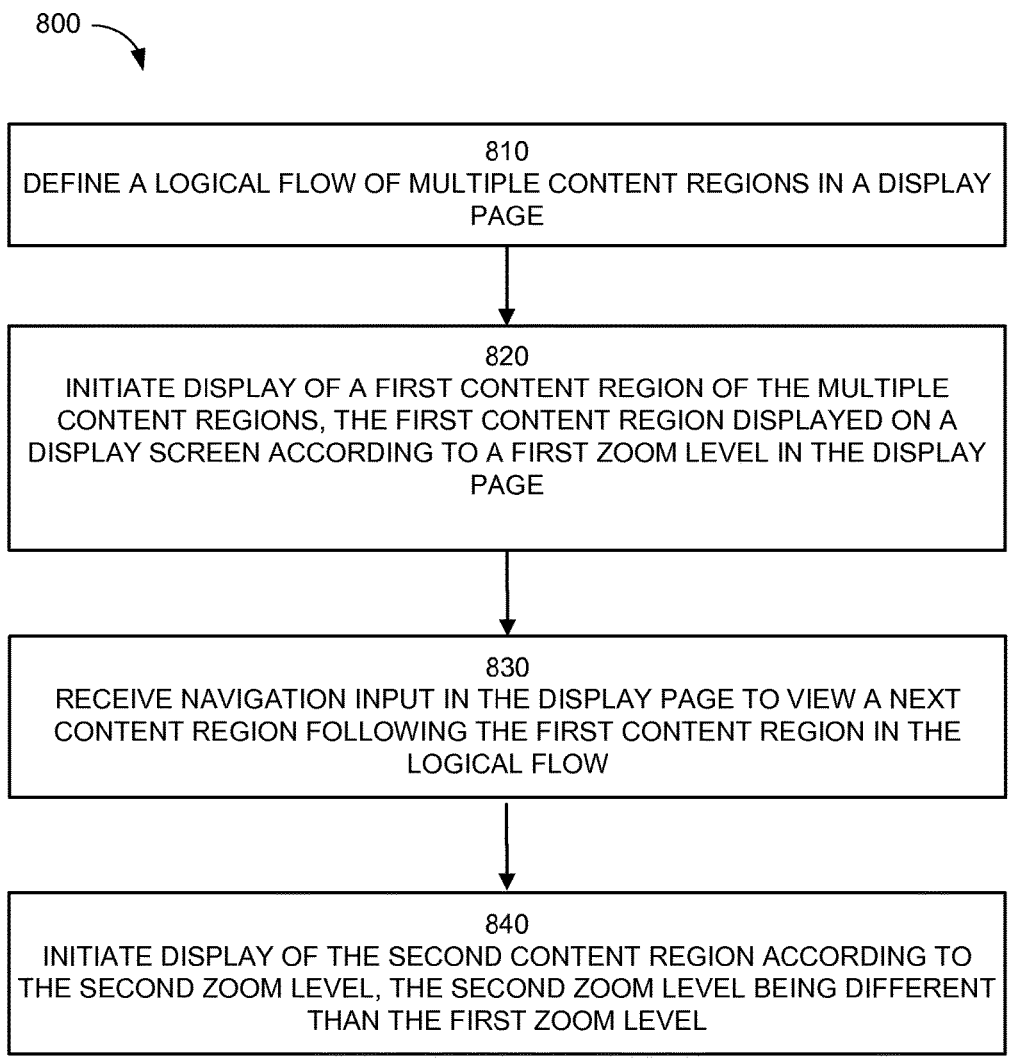

More particularly, FIG. 8 is an example flowchart 800 illustrating operations associated with navigating a viewport through the logical flow of multiple content regions in a display page according to embodiments herein. Note that flowchart 800 of FIG. 8 and corresponding text below may overlap with, refer to, and expand on some of the matter previously discussed with respect to FIGS. 1-7. Also, note that the steps in the flowcharts below need not always be executed in the order shown.

In step 810, a logical flow of multiple content regions 151 in a display page 150 is identified. In step 820, a display of a first content region of the multiple content regions is initiated, and the first content region is displayed on a display screen according to a first zoom level in the display page. Next in step 830, navigation input in the display page (from user input or other source) is received to view a next content region following the first content region in the logical flow. Next in step 840, display of the second content region is initiated according to the second zoom level, the second zoom level being different than the first zoom level.

Figure 9:
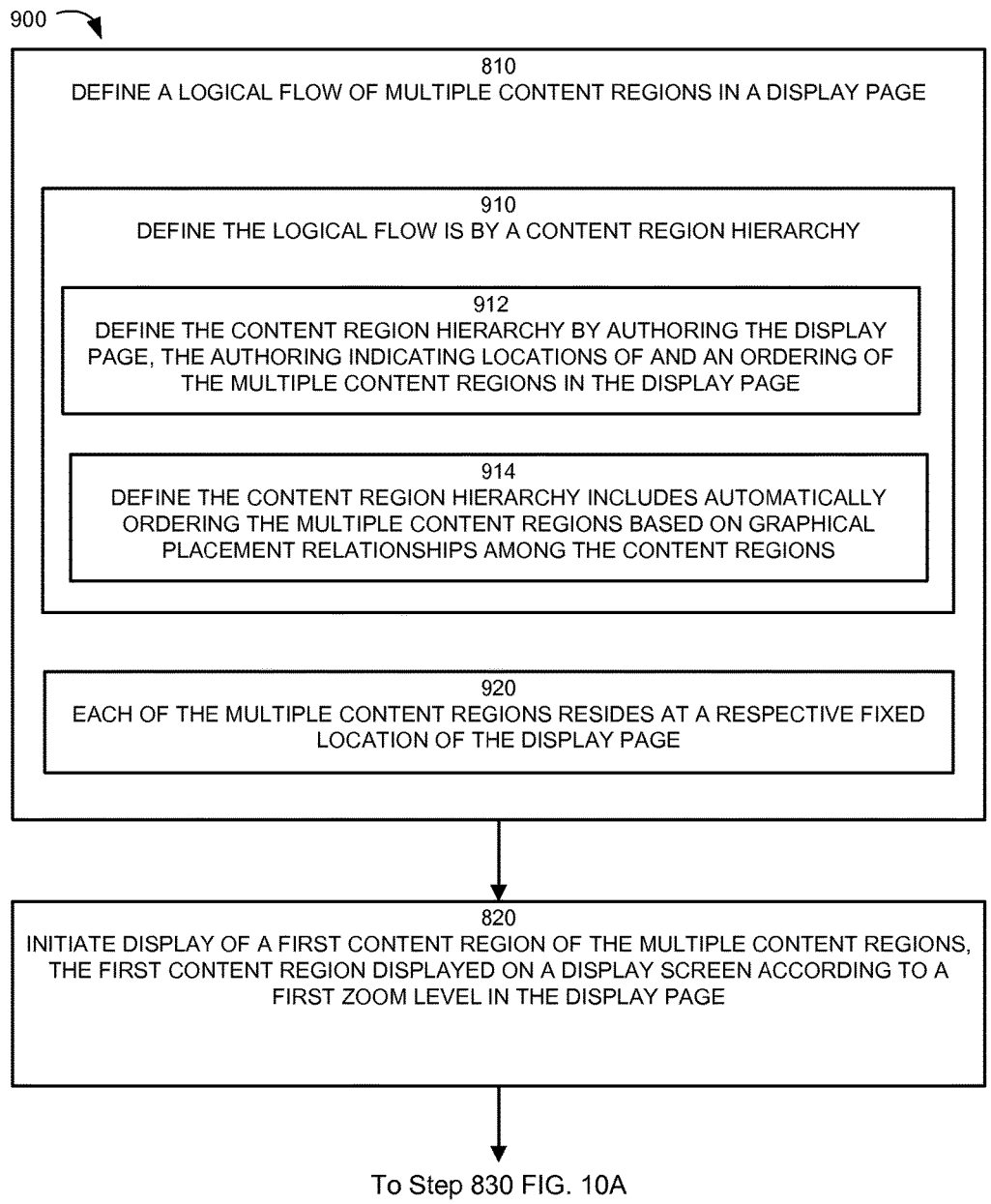

FIG. 9 is an example flowchart 900 that expands on flowchart 800 by illustrating details of operations associated with identifying content regions and navigating a viewport to display content from display page according to embodiments herein. In step 810, a logical flow of multiple content regions 151 in a display page 150 is identified. In step 910, a logical flow of multiple content regions in a display page is defined. In step 912, the content region hierarchy is defined by authoring the display page, the authoring indicating locations of an ordering of the multiple content regions in the display page. In step 914, the content region hierarchy 162 is optionally defined by automatically ordering the multiple content regions based on graphical placement relationships among the content regions. In one embodiment content region hierarchy is defined using techniques described in U.S. patent application Ser. No. 12/252, 626, now U.S. Pat. No. 8,539,342. In step 920, each of the multiple content regions resides at a respective fixed location of the display page.

FIGS. 10A and 10B are example flowcharts 1000 and 1050 that expand on flowchart 800 by illustrating details of operations associated identifying content regions and navigating through content regions according to embodiments herein. In step 830, navigation input is received to view a next content region following the first content region in the logical flow. In step 1010, a second content region is identified, the second content region following the first content region in the logical flow. In step 1020, analyzing parameters of the second content region are analyzed to determine a second zoom level for viewing the second content region. In step 1022, it is determined whether symbols in the second content region are viewable at a given viewport size depending on an authored indication of viewability or associated with the second content region and a predetermined setting of viewability.

In step 1030, display of the second content region is initiated according to the second zoom level, the second zoom level being different than the first zoom level. In step 1032, the viewport navigates, in a direction other than a physical direction as specified by the navigation input, to a location of the second content region in the display page to display the second content region. For example, in response to a user pressing a down arrow on a keyboard, embodiments herein can include panning up in the display page to view a second content region. In step 1034, the viewport navigates to a location as indicated by the logical flow of multiple content regions. In step 1036, display of text in the second content region is initiated to be substantially similar in size as text displayed in the first content region. In step 1038, for the second content region, the viewport automatically zooms in the display page depending on an authored indication of text size associated with the first content region and the second content region and a predetermined setting of readability. In one embodiment, the content region can have an associated zoom level indicating a zoom level for displaying a respective content region. Accordingly, a viewer need not manually adjust zooming each time a user views a subsequent content region in the flow.

After initiating a display of the second content region in step 1030, in step 1052 a first portion of the second content region is displayed in a window. Next in step 1054, in response to receiving additional navigation input to scroll down the second content region, display of a second portion of the second content region in the window is initiated. In step 1056, navigation input to view the next content region and the additional navigation input to scroll down in the second content region are generated in response to selection of a same selectable navigation button selected at different times.

FIGS. 11-14 are example flowcharts illustrating another embodiment having operations associated with navigating a viewport through the logical flow of multiple content regions in a display page according to embodiments herein. Note that flowchart of FIGS. 11-14 and corresponding text below may overlap with, refer to, and expand on some of the matter previously discussed with respect to FIGS. 1-7. Also, note that the steps in the flowcharts below need not always be executed in the order shown.

Figure 11:
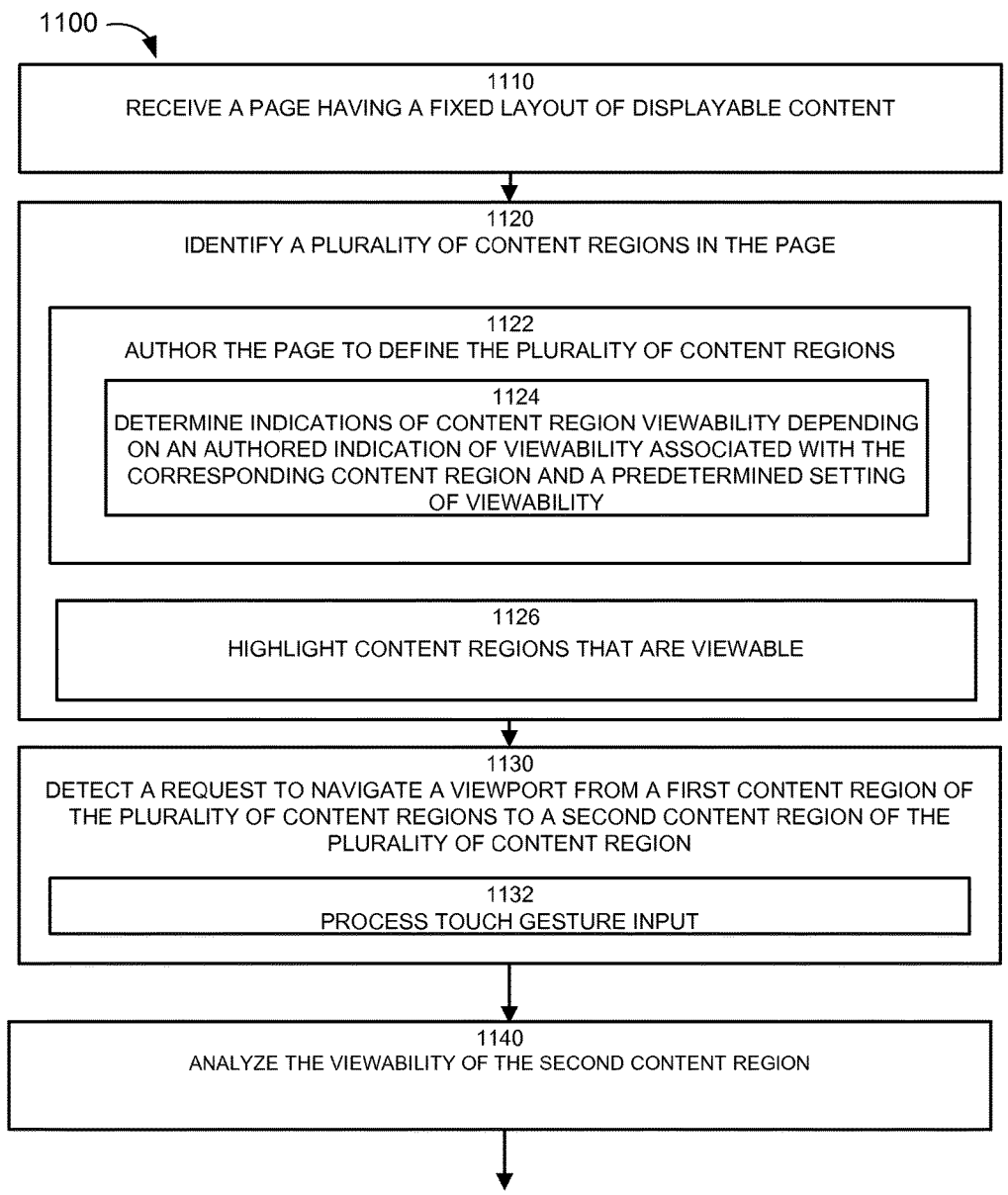

FIG. 11 is an example flowchart 1100 illustrating operations associated with navigating a viewport through the logical flow of multiple content regions in a display page according to embodiments herein. In step 1110, a device receives a page having a fixed layout of displayable content.

In step 1120, a plurality of content regions in the page is identified. In step 1122, the page is authored to define the plurality of content regions. In step 1124, indications of content region viewability are determined depending on an authored indication of viewability associated with the corresponding content region and a predetermined setting of viewability. In step 1126, content regions that are viewable are optionally highlighted.

In step 1130, a request is detected to navigate a viewport from a first content region of the plurality of content regions to a second content region of the plurality of content region. In step 1132, touch gesture input is optionally processed to navigation instructions to the viewport navigator 140. In this step a user can use, for example a variety of multiple finger touch gestures to navigate to the next readable content region, to navigate over larger content region, used for browsing, and to navigate to a preceding or following display page. In step 1140, the viewability of the second content region is analyzed.

Figure 12:
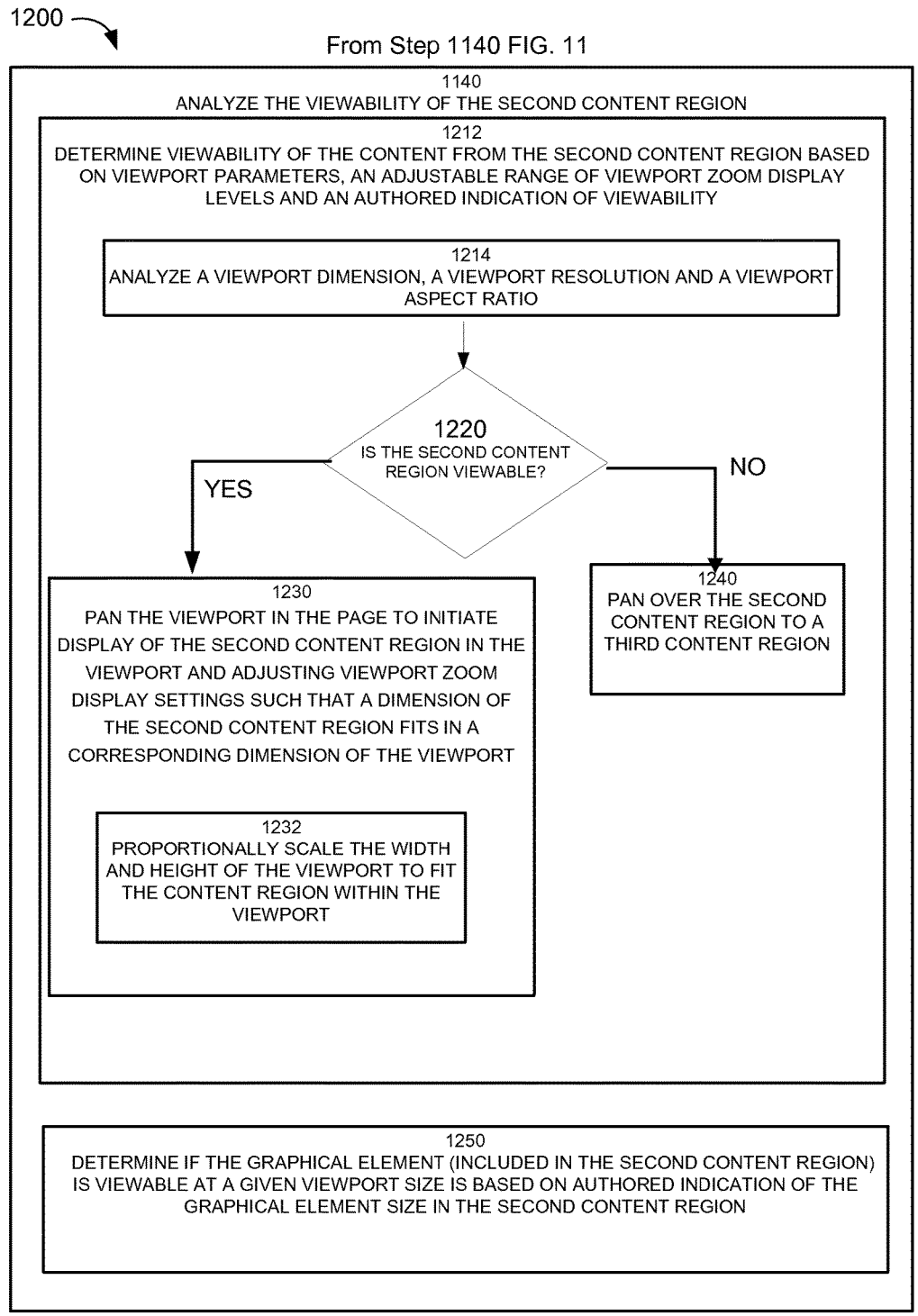

FIG. 12 is an example flowchart 1200 illustrating operations associated with navigating a viewport through the logical flow of multiple content regions in a display page according to embodiments herein. In step 1140, the viewability of the second content region is analyzed. In step 1212, the viewability of the content from the second content region based on viewport parameters, an adjustable range of viewport zoom display levels and an authored indication of viewability are determined. In step 1214, a viewport dimension, a viewport resolution and a viewport aspect ratio is analyzed. In step 1216, a viewport dimension, a viewport resolution and a viewport aspect ratio are analyzed. As part of the analysis in step 1216 a determination is made whether the second content region is viewable in step 1220. If the second content region is viewable the viewport navigator continues to step 1230, where the viewport navigates in the page to initiate display of the second content region in the viewport and the viewport zoom display levels are adjusted such that a dimension of the second content region fits in a corresponding dimension of the viewport, in step 1232, the width and optionally the height of the viewport are proportionally scaled to fit the corresponding width and height of the content region within the viewport and the process continues in step 1250.

If the second content region is not viewable the process continues at step 1240. In certain embodiments, the viewport navigator 140 determines interim content regions that include content that the user could not read and skips over these interim content regions to a content region in the logical flow with readable or viewable content. In step 1240, in response to determining that the second content region is not viewable, the viewport navigates over the second content region to a third content region if that content region is viewable.

In step 1250, if the second content region includes a graphical element, it is determined if the graphical element (included in the second content region) is viewable at a given viewport size is based on authored indication of the graphical element size in the second content region.

FIG. 13 is an example flowchart 1300 illustrating operations associated with navigating a viewport through the logical flow of multiple content regions in a display page according to embodiments herein. If a content region includes text, in addition to determining whether a content region is viewable the following steps determine whether the text is readable. In step 1310, it is determined whether the text (the page includes a plurality of columns of text and the second content region includes corresponding text) is readable based on viewport parameters and an authored indication of text readability in the second content region.

In step 1312, the authored indication of text readability in the second content region is stored in a location such as a page document object model (DOM). In step 1314, viewport parameters including a viewport width, a viewport resolution and a viewport aspect ratio are analyzed. In step 1316, the viewport zooms to match width of the content region as a function of an authored indication of the size of text. In step 1318, viewport zoom level is provided to enable the text to be readable according to a predetermined setting for readability.

Figure 14:
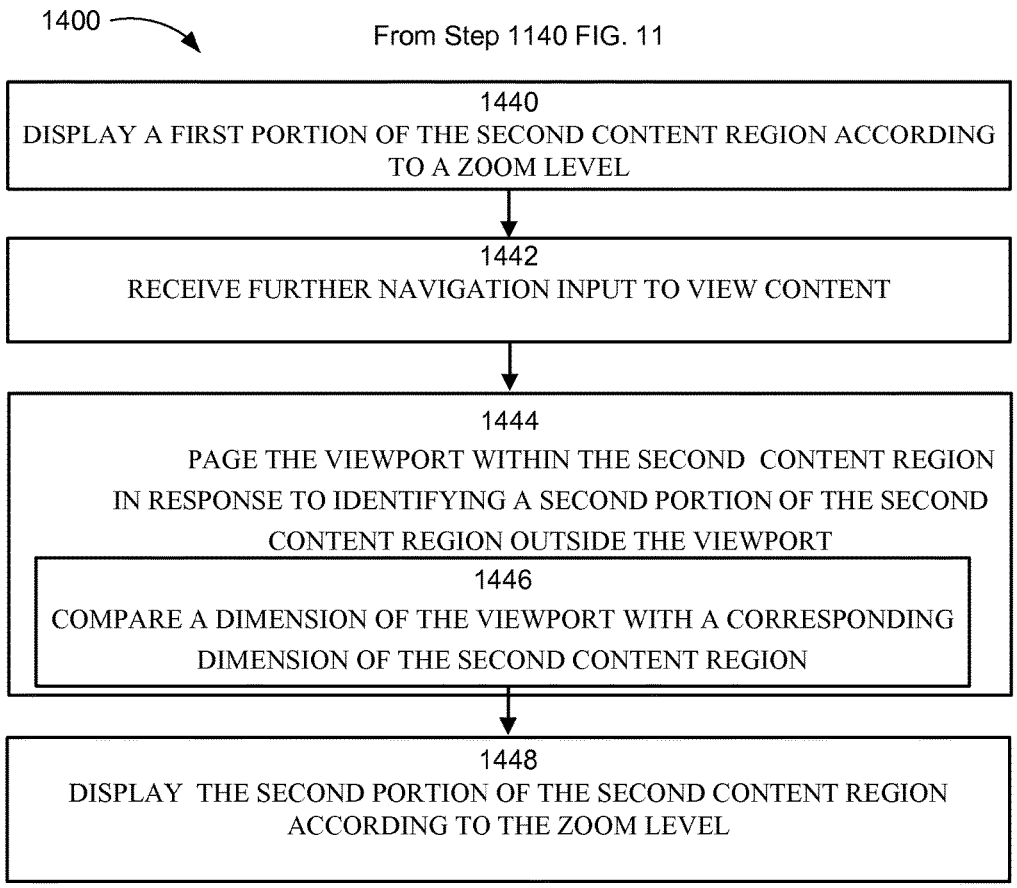

FIG. 14 is an example flowchart 1400 illustrating operations associated with navigating a viewport through the logical flow of multiple content regions in a display page according to embodiments herein. In step 1440, a first portion of the second content region is displayed according to a zoom level. Next in step 1442, further navigation input to view content is received. In step 1444, the viewport is paged within the second content region in response to identifying a second portion of the second content region outside the viewport. The identifying step 1444 can include step 1446 where a dimension (e.g., height or width) of the viewport is compared with a corresponding dimension of the second content region. Finally, in step 1448, the second portion of the second content region is displayed according to the zoom level used to display the first portion of the second content region.

Figure 15:
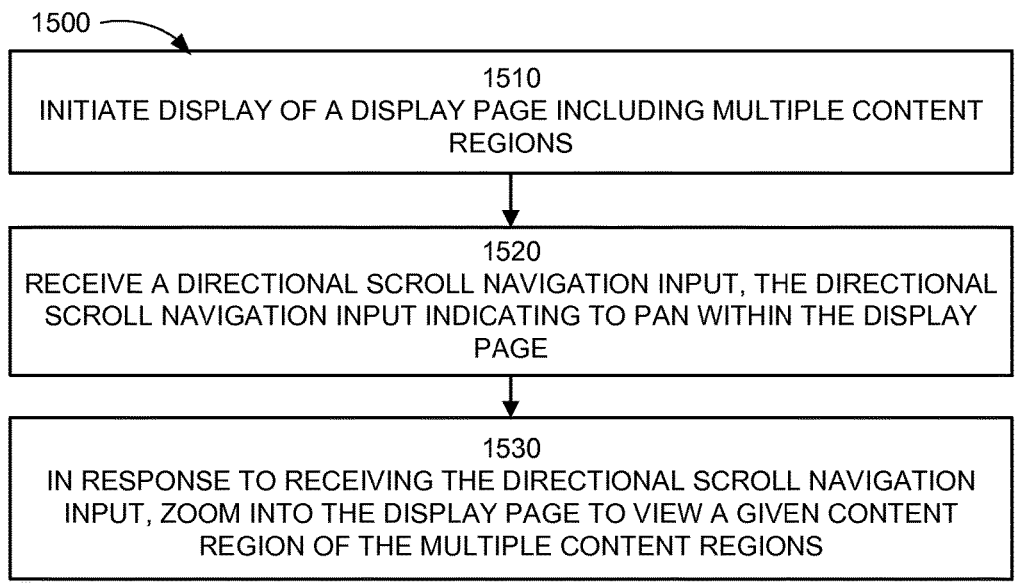

FIG. 15 is an example flowchart 1500 illustrating operations associated with navigating a viewport through the logical flow of multiple content regions in a display page according to embodiments herein.

In step 1510, display of a display page including multiple content regions is initiated. In step 1520, directional navigation input to the display page is received, the directional navigation input indicating to pan within the display page. In step 1530, in response to receiving the directional navigation input, the viewport navigator zooms into the display page to view a given content region of the multiple content regions.

In another embodiment (not shown), viewport navigation is combined with traditional pan and zoom controls. It is also possible to implement a conventional pan and zoom scrolling interface based on keypad or gesture inputs which could be combined operationally with the viewport navigator 140. In still another embodiment, commands or gestures (e.g., from a touch device) are used to skip to various level of the hierarchy according to the logical flow.

Those skilled in the art will understand that there can be many variations made to the operations of the user interface explained above while still achieving the same objectives of the invention. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method comprising:
    defining a logical flow of multiple content regions in a web page according to a hierarchy that organizes the content regions in the web page, the defining comprising associating authored indications of viewability with respective ones of the multiple content regions, wherein:
        the hierarchy organizes a first content region and a second content region of the web page in a first level of the hierarchy,
        the hierarchy further organizes content sub-regions of the first content region in a deeper level of the hierarchy, the deeper level starting from the first content region in the first level,
        the logical flow specifies a navigation from the first content region to the second content region based on a first association between the first level of the hierarchy and a first navigation input from a computing device, and
        the logical flow further specifies a navigation between the content sub-regions based on a second association between the deeper level of the hierarchy and a second navigation input from the computing device;
    initiating, in response to a request for the web page, display of the web page in a window on a display screen of the computing device, wherein the first content region and the second content region are presented in a single view within the window based on the first level of the hierarchy, and wherein the content sub-regions are presented in the single view within the first content region based on the deeper level of the hierarchy;
    initiating, in response to a navigation input display of the first content region in the window, wherein the first content region is resized to fit the window according to a first zoom level; and
    in response to receiving an additional navigation input to display a next content region following the display of the first content region:
        identifying the second content region and an authored indication of viewability associated therewith, the second content region identified by at least determining that (i) the additional navigation input matches the first navigation input associated with the first level of the hierarchy and that (ii) the logical flow specifies a display of the second region following the display of the first content region based on the first association;
        analyzing parameters of the second content region, parameters of the authored indication of viewability, and parameters of the window on the display screen, the analyzing including determining a second zoom level for displaying the second content region in the window by resizing the second content region to fit the window, wherein the second zoom level is different from the first zoom level; and
        initiating the display of the second content region in the window according to the second zoom level.

2. The computer-implemented method as in claim 1, wherein initiating display of the second content region according to the second zoom level includes navigating, in a direction within the web page other than a physical direction as specified by the navigation input, to a location of the second content region in the web page to display the second content region.

3. The computer-implemented method as in claim 2, wherein initiating display of the second content region according to the second zoom level comprises initiating display of text in the second content region to be similar in size as text displayed in the first content region.

4. The computer-implemented method as in claim 3, wherein initiating display of the second content region to be similar in size includes automatically zooming in the web page depending on the authored indication of viewability, the authored indication of viewability being an author-defined indication of text size associated with the first content region and the second content region.

5. The computer-implemented method as in claim 1, wherein:
    the authored indication of viewability is created by an author of content included in the second content region prior to displaying the first content region; and
    the analyzing parameters of the second content region further includes determining whether symbols in the second content region are viewable depending, at least in part, on the authored indication of viewability associated with the second content region and a predetermined setting of viewability.

6. The computer-implemented method as in claim 2, wherein navigating includes navigating to a location as indicated by the logical flow of multiple content regions.

7. The computer-implemented method as in claim 6, wherein the hierarchy is defined by authoring the web page, the authoring indicating locations of and an ordering of the multiple content regions in the web page.

8. The computer-implemented method as in claim 6, wherein defining the hierarchy includes automatically ordering the multiple content regions based on graphical placement relationships among the content regions.

9. The computer-implemented method as in claim 1, wherein each of the multiple content regions resides at a respective fixed location of the web page, and wherein the first zoom level is based on the authored indication of viewability associated with the first content region and the user selected setting.

10. The computer-implemented method as in claim 1, wherein initiating display of the second content region includes display of a first sub-column of the second content region in the window, the method further comprising:

in response to receiving a further navigation input to scroll down the second content region, initiating display of a second sub-column of the second content region in the window based on a match between the further navigation input and the second navigation input.

11. The computer-implemented method as in claim 10, wherein the navigation input to view the next content region and the further navigation input to scroll down in the second content region are generated in response to selection of a same selectable navigation button selected at different times.

12. A computer-implemented method comprising:

receiving, at a computing device, a web page having a fixed layout of displayable content therein;

identifying, by the computing device, a plurality of content regions in the web page, a hierarchy of the plurality of content regions, and authored indications of viewability associated with respective ones of the plurality of content regions, wherein the authored indications of viewability are created by an author of content included in the web page, wherein the hierarchy organizes a first content region and a second content region of the web page in a first level of the hierarchy, wherein the hierarchy further organizes content sub-regions of the first content region in a deeper level of the hierarchy, the deeper level starting from the first content region in the first level;

defining, by the computing device, a logical flow of the plurality of content regions according to the hierarchy, wherein the logical flow specifies a navigation from the first content region to the second content region based on a first association between the first level of the hierarchy and a first navigation input from the computing device, and wherein the logical flow further specifies a navigation between the content sub-regions based on a second association between the deeper level of the hierarchy and a second navigation input from the computing device, initiating, in response to a request for the web page, display of the web page in a viewport on a display screen of the computing device, wherein the first content region and the second content region are presented together in the viewport based on the first level of the hierarchy, and wherein the content sub-regions are presented together within the first content region based on the deeper level of the hierarchy;

detecting, by the computing device, a request to navigate the viewport from the first content region;

determining, by the computing device, that the logical flow specifies, based on the request comprising the first navigation input, the navigation to the second region following the first content region; and analyzing, by the computing device, an authored indication of viewability associated with the second content region, the analyzing including determining a zoom level for rendering viewability of content from the second content region in the viewport by resizing the second content region to fit the viewport, wherein the zoom level is different from the a zoom level of the first content region in the viewport.

13. The computer-implemented method as in claim 12, wherein:

the authored indication of viewability is created by an author of content included in the second content region prior to displaying the first content region; and the analyzing the viewability of the second content region further includes determining the zoom level for rendering viewability of the content from the second content region in the viewport based on viewport parameters, an adjustable range of viewport zoom display levels, and the authored indication of viewability.

14. The computer-implemented method as in claim 13, wherein the viewport parameters include one or more of a viewport dimension, a viewport resolution and a viewport aspect ratio.

15. The computer-implemented method as in claim 13, further comprising:

navigating the viewport including processing touch gesture input in the web page to initiate display of the second content region in the viewport;

in response to determining that the content from the second content region is viewable, adjusting viewport zoom display levels by matching both a width and height of the viewport to fit a corresponding width and height of the content region within the viewport such that a dimension of the second content region fits in a corresponding dimension of the viewport; and navigating over the second content region to a third content region in response to determining that the content from the second content region is not viewable.

16. The computer-implemented method as in claim 12, wherein identifying the plurality of content regions in the web page includes authoring the web page to define:

the plurality of content regions; and authored indications of viewability associated with respective ones of the plurality of content regions.

17. The computer-implemented method as in claim 12, wherein the second content region includes a graphical element, the method further comprising determining if the graphical element is viewable at a given viewport size based on the authored indication of viewability, the authored indication of viewability being an author-defined indication of the graphical element size in the second content region.

18. The computer-implemented method as in claim 12, wherein:

the web page includes a plurality of columns of text and the second content region includes corresponding text; and the analyzing the viewability of the second content region further includes determining whether the text is readable based on viewport parameters and the authored indication of viewability, the authored indication of viewability being an indication of text readability in the second content region; the method further comprising:

highlighting the second content region if the corresponding text is not viewable.

19. The computer-implemented method as in claim 12 further comprising:

displaying a first portion of the second content region according to the zoom level;

receiving further navigation input to view content;

paging the viewport within the second content region in response to identifying a second portion of the second content region outside the viewport by comparing a dimension of the viewport with a corresponding dimension of the second content region; and displaying the second portion of the second content region according to the zoom level and the user selected setting.

20. A non-transitory computer-readable storage medium having instructions stored thereon, that, when executed by a processor of a computing device, cause the processor to perform operations comprising:
defining a logical flow of multiple content regions in a web page based on a hierarchy that organizes the multiple content regions, the defining comprising associating authored indications of viewability with respective ones of the multiple content regions, wherein:
the hierarchy organizes a first content region and a second content region of the web page in a first level of the hierarchy,
the hierarchy further organizes content sub-regions of the first content region in a deeper level of the hierarchy, the deeper level starting from the first content region in the first level,
the logical flow specifies a navigation from the first content region to the second content region based on a first association between the first level of the hierarchy and a first navigation input from a computing device, and
the logical flow further specifies a navigation between the content sub-regions based on a second association between the deeper level of the hierarchy and a second navigation input from the computing device;
initiating, in response to a request for the web page, display of the web page in a window on a display screen of the computing device, wherein the first content region and the second content region are presented in a single view within the window based on the first level of the hierarchy, and wherein the content sub-regions are presented in the single view within the first content region based on the deeper level of the hierarchy;
initiating, in response to a navigation input of the first content region-in the window, wherein the first content region is resized to fit the window according to a first zoom level; and
in response to receiving, at the computing device, an additional navigation input to display a next content region following the display of the first content region:
identifying the second content region and an authored indication of viewability associated therewith, the second content region identified by at least determining that (i) the additional navigation input matches the first navigation input and that (ii) the logical flow specifies a display of the second region following the display of the first content region based on the first association;
analyzing parameters of the second content region, the authored indication of viewability associated with the second content region, and a dimension of the window on the display screen, the analyzing including determining a second zoom level for displaying the second content region in the window by resizing the second content region to fit the window, wherein the second zoom level is different from the first zoom level based on the different columns having different dimensions in the web page; and
initiating the display of the second content region according to the second zoom level.

21. The computer-readable storage medium of claim 20, wherein:
the first region and the second content region each include text;
the authored indication of viewability associated with the first content region is an author-selected indication of text size associated with the first content region and the second content region; and
the first zoom level is based on the authored indication of viewability associated with the first content region and the user selected setting.

22. The computer-implemented method of claim 1, further comprising:
receiving a user selection of a content topic;
determining that the logical flow specifies a navigation from the second content region to a third content region and a navigation from the third content region to a fourth content region;
updating the logical flow to navigate from the second content region to the fourth content region by skipping the third content region based on a determination that the second content region and the fourth content region are about the content topic and that the third content region is about a different content topic, the updated logical flow stored in memory; and
in response to additional navigation input, initiating a display of the fourth content region by at least navigating from the second content region and skipping the third content region based on the updated logical flow from the memory.

23. The computer-implemented method of claim 1, wherein the authored indication of viewability is identified from metadata of the second content region and specifies the parameters that limit the resizing of the second content region, wherein analyzing the authored indication of viewability comprises determining that the proportional scaling of the height or the width of the second content region exceeds the parameters, and wherein the proportional scaling is limited according to the parameters.

* * * * *